United States Patent
Shiraga (10) Patent No.: US 6,947,035 B1
(45) Date of Patent: Sep. 20, 2005

(54) BATTERY POWERED ELECTRICAL EQUIPMENT WITH POWER SAVING OPERATION

(75) Inventor: Shinji Shiraga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/794,772

(22) Filed: Feb. 3, 1997

Related U.S. Application Data (63) Continuation of application No. 08/300,492, filed on Sep. 2, 1994, now abandoned.

(30) Foreign Application Priority Data

Sep. 2, 1993 (JP) .............................................. 5/218828

(51) Int. Cl.[7] ................................................. G09G 5/00
(52) U.S. Cl. ......................... 345/211; 345/901; 713/320
(58) Field of Search ................................ 345/211, 212, 345/901, 905, 102, 213; 713/320, 321, 324, 340; 320/132, 133, 114, 14, 22–24, 48; 358/406, 400, 404

(56) References Cited

U.S. PATENT DOCUMENTS

| | | | |
|---|---|---|---|
| 3,487,263 A | * | 12/1969 | Pahlavan ..................... 345/35 |
| 4,121,204 A | * | 10/1978 | Welch et al. .................. 345/35 |
| 4,638,237 A | * | 1/1987 | Fernandez .................... 320/48 |
| 5,032,825 A | * | 7/1991 | Kuznicki ..................... 340/636 |
| 5,043,651 A | * | 8/1991 | Tamura ........................ 320/43 |
| 5,115,182 A | * | 5/1992 | Ehmke et al. ................. 320/14 |
| 5,130,659 A | * | 7/1992 | Sloan ......................... 324/435 |
| 5,182,655 A | * | 1/1993 | Motoyanagi ................. 358/406 |
| 5,202,668 A | * | 4/1993 | Nagami ...................... 345/211 |
| 5,218,705 A | * | 6/1993 | DeLuca et al. ............. 364/707 |
| 5,239,495 A | * | 8/1993 | Nanno et al. ............... 364/707 |
| 5,248,929 A | * | 9/1993 | Burke ......................... 320/48 |
| 5,311,441 A | * | 5/1994 | Tayama et al. ............. 364/707 |
| 5,341,503 A | * | 8/1994 | Gladstein et al. ........... 395/750 |
| 5,384,564 A | * | 1/1995 | Wycoff et al. ......... 340/825.94 |
| 5,396,443 A | * | 3/1995 | Mese et al. ................. 364/707 |
| 5,455,499 A | * | 10/1995 | Uskali et al. ................. 320/43 |
| 5,659,761 A | * | 8/1997 | DeArras et al. ............ 713/300 |

* cited by examiner

*Primary Examiner*—Regina Liang
*Assistant Examiner*—Jennifer T. Nguyen
(74) *Attorney, Agent, or Firm*—Fitzpatrick, Cella, Harper & Scinto

(57) ABSTRACT

Battery powered electrical equipment such as a portable personal computer operates in one of plural power saving modes to control operating speed and display brightness. The remaining capacity of the battery powering the electrical equipment is derived and one of the power saving modes is selected. The selected power saving mode is automatically displayed in close relationship with the remaining battery capacity so that an operator can readily determine the remaining operating time of the equipment.

7 Claims, 6 Drawing Sheets

BATTERY POWERED ELECTRICAL EQUIPMENT WITH POWER SAVING OPERATION

This application is a continuation of application Ser. No. 08/300,492 filed Sep. 2, 1994, now abandoned.

FIELD OF THE INVENTION

This invention relates to electric equipment with power saving modes energized by a battery and more particularly, to portable electric equipment with batteries having power saving modes.

BACKGROUND OF THE INVENTION

In battery powered electrical equipment, remaining battery capacity can be detected and displayed to certify a term of energizing the equipment. There is other equipment in which an energy saving mode or usual mode can be selected to prolong the term of energizing the equipment. In this equipment, an operator has to operate some keys. Furthermore, it is necessary to operate some keys to insure a current energy saving mode. In this case, the displayed current energy saving mode has no relation to the displayed remaining battery capacity. That is why it is difficult to confirm that an appropriate energy saving mode is selected in accordance with the remaining battery capacity by the contents of displayed information. Furthermore, while executing data processing in a normal energy saving mode, the equipment sometimes goes down and important data are lost as a result of loss of the battery power.

Even if the remaining battery capacity and the selected battery energy mode are displayed simultaneously, it is difficult for an operator to select an appropriate mode for desired operating time.

BRIEF SUMMARY OF THE INVENTION

The present invention has been made in consideration of the above situations, and has as one of its objects providing electric equipment capable of superimposing remaining operating time and the adopted power saving mode. Accordingly, the operator can easily understand how long the battery can supply power if the equipment operates in the current power saving mode and can select a desirable, power saving mode to provide adequate processing speed of the CPU and adequate brightness of the display unit.

It is another object of the present invention to provide electric equipment capable of displaying in close relationship the detected remaining battery capacity and the adopted power saving mode, so that the operator can easily understand how long the battery can supply power if the equipment works in the current power saving mode and can select the desirable and appropriate power saving mode to provide adequate processing speed of the CPU and adequate brightness of the display unit.

It is a further object of the present invention to provide electric equipment capable of indicating the detected remaining battery capacity and the adopted power saving mode. Therefore, the operator can easily understand how long the battery can supply power and can select the desirable and appropriate power saving mode to control the processing speed of the CPU and the brightness of the display unit.

The invention will be better understood from the following more detailed description taken with the accompanying drawings and claims.

DETAILED DESCRIPTION OF THE PREFERRED EMBODIMENTS

Embodiments according to the present invention will now be described with reference to the accompanying drawings.

First Embodiment

Figure 1:
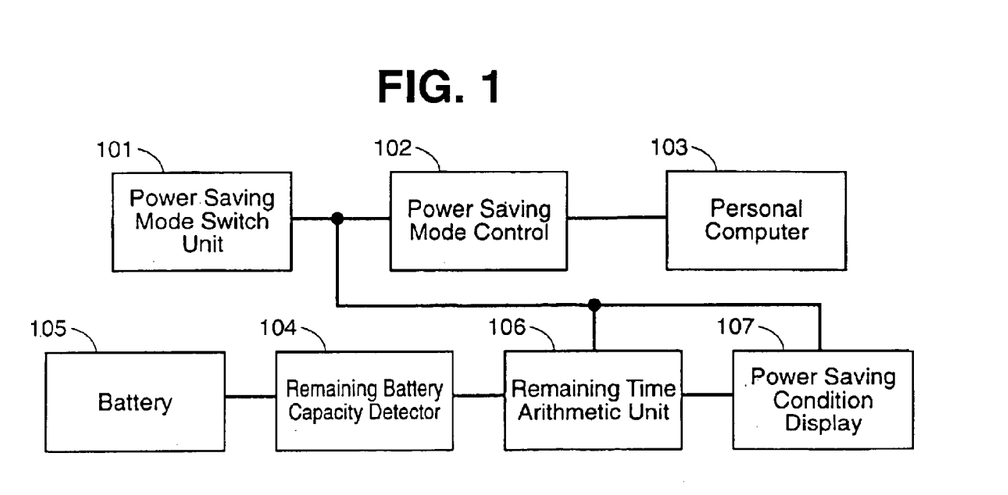
FIG. 1 is a block diagram showing construction of a portable electric equipment in the first embodiment.

FIG. 1 is a block diagram showing construction of electric equipment in the first embodiment. The equipment is, for example, a personal (note book type) computer. In FIG. 1, numeral 101 denotes a power saving mode switch unit for selecting one of plural electric power saving modes. Numeral 102 denotes a power saving mode control unit for executing the mode selected by the power saving mode switch unit 101 on a personal computer unit 103. Numeral 104 denotes a remaining battery capacity detecting unit for detecting the remaining capacity of a battery 105. Numeral 106 denotes a remaining time arithmetic unit for estimating the time that the remaining battery capacity can be used in the power saving mode. Numeral 107 denotes a power saving condition display unit for displaying the time that the remaining battery capacity can be used in the power saving mode and furthermore a current mode which is selected by the power saving mode switch unit 101 is exhibited on the displayed time.

As described above, the time that the remaining battery capacity can be used which is detected by the detecting unit 104 is estimated by the arithmetic unit 106 and a display of the estimated time is exhibited on a display of the selected power saving mode. Therefore, an operator recognizes the condition of the equipment and if the operator changes from one power saving mode to another mode, the power saving mode control unit 102 can control processing speed of the personal computer unit 103 and brightness of a display panel which is installed in a display unit housing 202 shown in FIG. 2.

Figure 2:
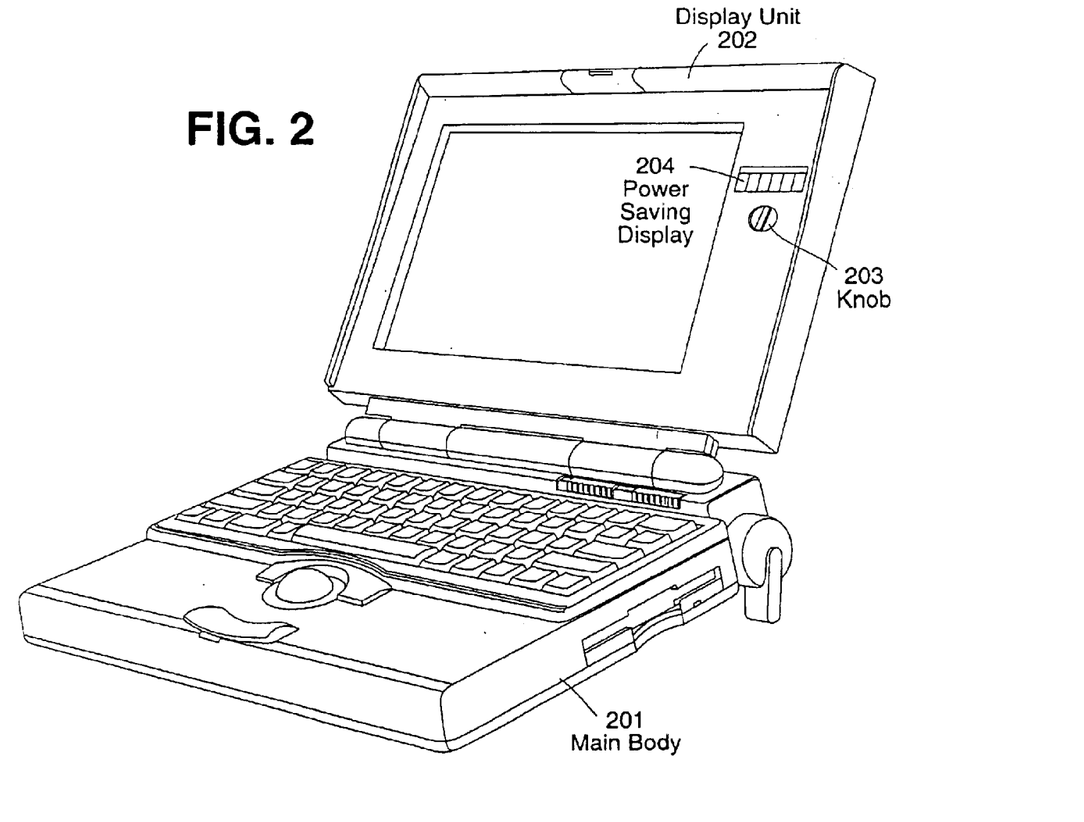
FIG. 2 is a perspective view of the portable electric equipment.

FIG. 2 is a perspective view of a portable electric equipment. In FIG. 2, numeral 201 is a main body housing, 202 is a display unit housing which swivels on the main body. Numeral 203 denotes a knob for changing from one power saving mode to another power saving mode. Numeral 204 denotes a power saving condition display unit which includes a small liquid crystal panel mounted on the display unit housing 202. The power saving mode switch unit 101 in FIG. 1 corresponds to the knob 203 in FIG. 2 and the power saving condition display unit 107 in FIG. 1 corresponds to the power saving condition display unit 204.

Figure 3:
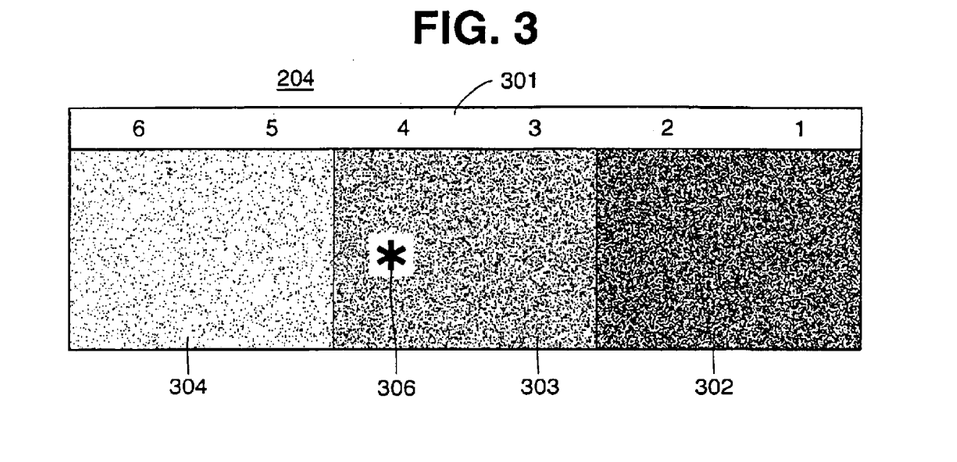
FIG. 3 is a diagram showing construction of a display apparatus for displaying an energy saving condition.

FIG. 3 shows the construction of the display apparatus 204 as shown in FIG. 2 for displaying an energy saving condition. In FIG. 3, Numeral 301 denotes power saving modes. In this embodiment, numerals 1 to 6 correspond to six power saving modes, the larger the numeral, the smaller the consumption of electric power.

Numerals 302, 303, 304 denote time areas. The display apparatus 204 as shown in FIG. 3 indicates that the remaining time is within thirty minutes in the modes 1 and 2. Furthermore, the display apparatus 204 as shown in FIG. 3 indicates the remaining time is about sixty minutes in the modes 3 and 4, and that the remaining time is more than two hours in modes 5 and 6. Numeral 306 (asterisk) shows that the mode 4 is currently selected.

Figure 4A:
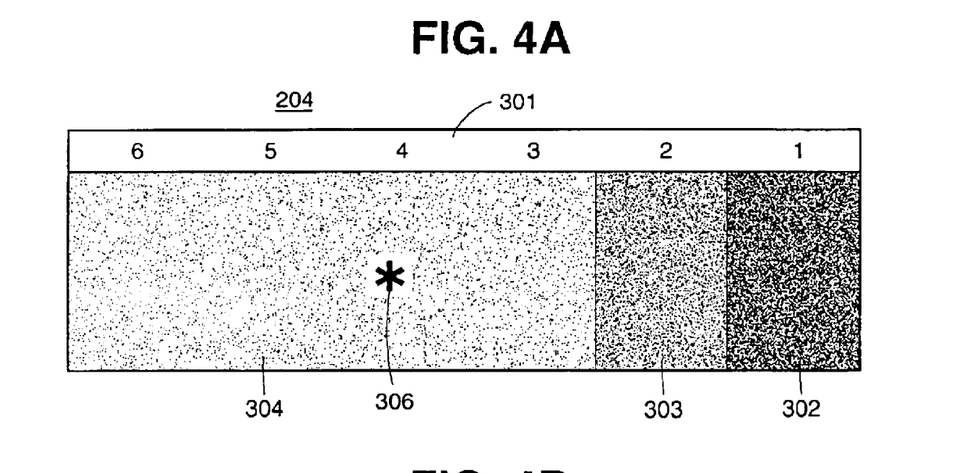
FIGS. 4A and 4B show a change of a time area in FIG. 3.
Figure 4B:
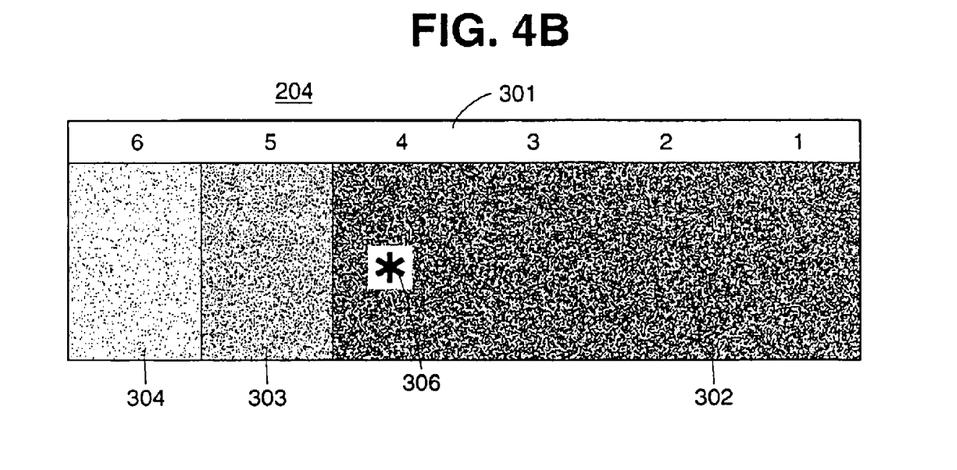

FIG. 4 is a diagram showing a condition of a change of a time area illustrated in FIG. 3. In FIG. 4(a), the power saving condition display unit 204 shows that the battery is at almost full capacity. In this case, the area of 304 which shows the remaining time as about two hours is large. In FIG. 4(b), the power saving condition display unit 204 shows that the battery capacity is almost empty. In this case, the area of 302 which shows the remaining time as within thirty minutes is larger. As described above, it is easy for the operator to understand both the current selected mode and the remaining time in accordance with the remaining battery.

Figure 5:
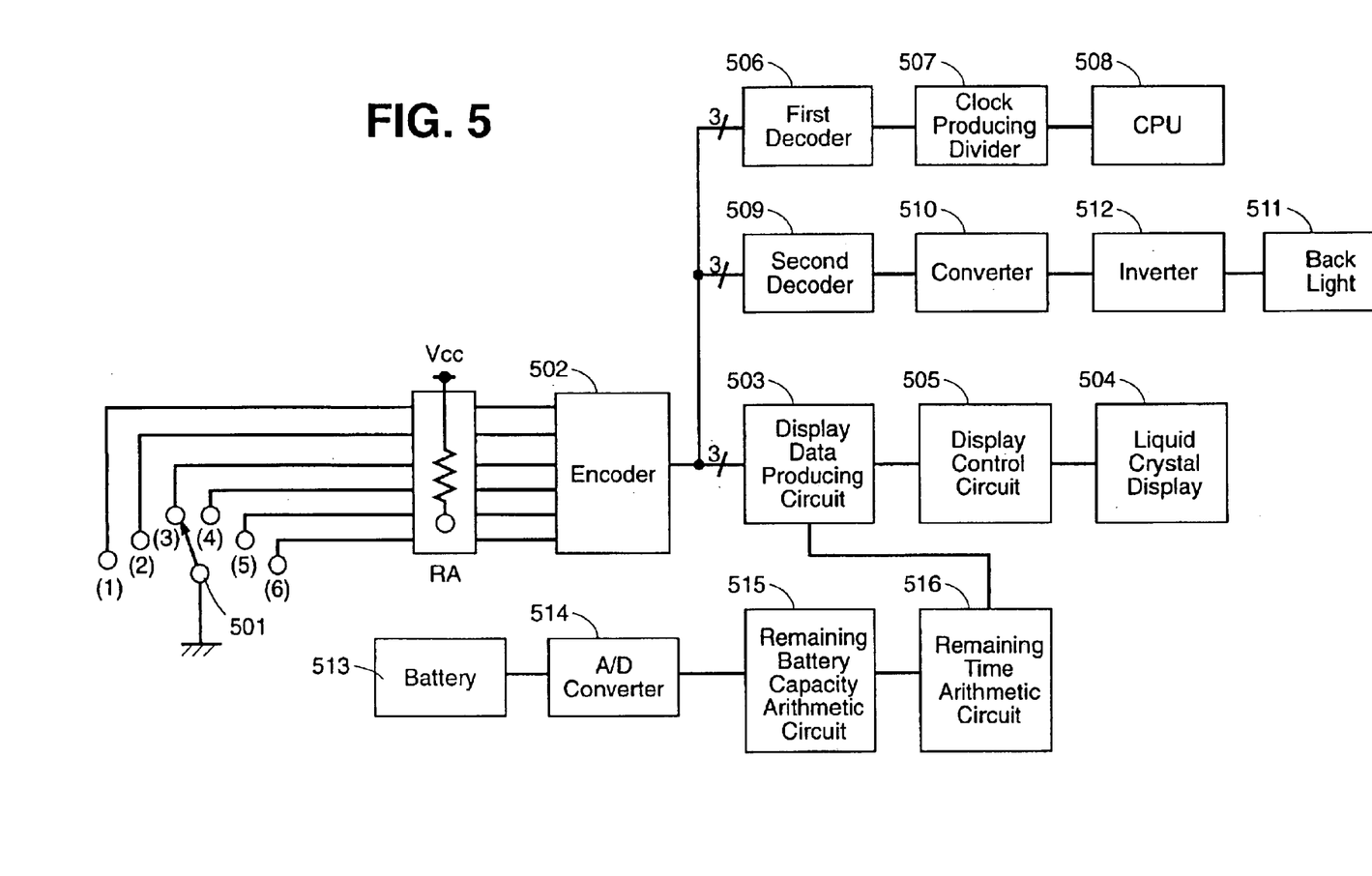
FIG. 5 is a block diagram showing construction of a control for electric equipment.

FIG. 5 is a block diagram showing a consumption control of the electric equipment. Construction and operation of the circuit block diagram will be described. A rotary switch 501 linked with the knob 203 shown in FIG. 2 grounds one of terminals 1 to 6. Each contact of contacts 1 to 6 is put at a high level returned to a voltage Vcc by a resistor RA and is connected to an encoder 502. Therefore, only the contact selected by the rotary switch 501 is at a low level and other five contacts are at the high level. The encoder 502 produces three bit data in accordance with the contact selected by the rotary switch 501. Thus, if the contact 1 is selected, the encoder 502 produces a (0, 0, 1) code. If the contact 5 is selected, it produces a (1, 1, 0) code. And if the contact 3 is selected, the encoder 502 produces a (0, 1, 1,) code. If the contact 4 is selected, it produces a (1, 0, 0) code.

In this embodiment, selecting one of the contacts corresponds to selecting one of power saving modes 1 to 6. The three data bits from the encoder 502 are transferred to a display data producing circuit 503. A display control circuit 505 decodes the three data bits and produces display information for displaying the asterisk 306 at the predetermined position on the liquid crystal display unit 504. A display control circuit 505 drives the liquid crystal display 504 to display the data from the display data producing circuit 503. Therefore, one of the power saving modes 1 to 6 which is selected by the knob 203 is displayed on the liquid crystal display unit 504. On the other hand, the three data bits from the encoder 502 are transferred to a first decoder 506. The first decoder 506 produces two data bits which show rate divided clock frequency as described below. That is, if the three data bits from the encoder 502 are (0, 0, 1) or (0, 1, 0), the rate divided clock frequency is X. If the three data bits from the encoder 502 are (0, 1, 1), the rate of divided clock frequency is X/2. If the three data bits from the encoder 502 are (1, 0, 1) or (1, 1, 0), the divided clock frequency rate is X/4.

The two bit rate divided clock frequency from the first decoder 506 are transferred to a producing/dividing clock circuit 507. The producing/dividing clock circuit 507 produces a 20 MHz clock and transfers the divided clock to a CPU and a peripheral circuit 508 in accordance with the dividing rate from the first decoder 506. Namely, if the rate is X, the circuit 507 produces a 20 MHz clock, and if the rate is X/2, the circuit 507 produces a 10 MHz clock, and if the rate is X/4, the circuit 507 produces a 5 MHz clock.

Furthermore, the three data bits from the encoder 502 are transferred to the second decoder 509 which produces an electric current to drive an invertor 512 as described below. That is, if the three data bits from the encoder 502 are (0, 0, 1), a digital value of the electric current for driving the invertor 512 is (1, 1), thus, a back light quantity of the display 504 is 3 W (3 watts). If the three data bits from the encoder 502 are (0, 1, 0), (0, 1, 1) or (1, 0, 1), the digital current value is (1, 0), and the back light quantity is 2 W 2 watts) the three data bits from the encoder 502 are (1, 0, 0) or (1, 1, 0), the digital current value is (0, 1) and the back light quantity is 1 W (1 watt).

The two bit electric current data from the second decoder 509 is transferred to a second converter 510. The converter 510 produces an analog electric current for driving the invertor 512 which supplies a voltage to the back light 511 that may be, for example, a cold-cathode tube.

As described above, by operating the knob 203, the working frequency of the CPU unit 508 in the personal computer unit 103 as shown in FIG. 1 changes between 20 MHz, 10 MHz and 5 MHz and light quantity of the blacklight 511 changes between 3 W, 2 W and 1 W. The working condition in the power saving mode 1 to 6 are set as follows. The CPU working frequency is 20 MHz and the light quantity of the blacklight is 3 W in the power saving mode 1. The CPU working frequency is 20 MHz and the light quantity of the blacklight is 2 W in power saving mode 2. The working frequency is 10 MHz and the back light quantity is 2 W in the power saving mode 3. The working frequency is 10 MHz and the back light power saving quantity is 1 W in the power saving mode 4. The working frequency is 5 MHz and the back light quantity is 2 W in the mode 5. The working frequency is 5 MHz and the back light quantity is W in the power saving mode 6. Therefore, the higher the working frequency of the CPU 508 is, the higher is the processing speed and the larger is the electric consumption. The lower the working frequency of the CPU 508 is, the lower is the processing speed and smaller is the electric consumption. Moreover, the larger the back light quantity is, the larger is the electric consumption. Less back light quantity reduces the electric consumption. Therefore, the power saving mode 1 has a highest processing speed and consumes the most electric power. The power saving mode 6 has the lowest processing speed and consumes the least electric power.

In FIG. 5, a terminal voltage of a battery which drives the equipment is transferred to an A/D converter 514 and the A/D converter 514 produces an eight bit digital code which is transferred to a remaining battery capacity arithmetic circuit 515. The remaining of battery capacity arithmetic circuit 515 calculates the remaining battery capacity in accordance with the digital value of the terminal voltage of the battery 513. A remaining time arithmetic circuit 516 calculates remaining time of battery in every mode in accordance with the result of the remaining of battery arithmetic circuit 515. The remaining time is (1) less than thirty minutes, (2) about one hour, (3) more than two hours. These remaining times correspond to the power saving modes 1 to 6. Data indicating the correspondence between each mode and the remaining of time is transferred to a display data producing circuit 503 and the shaded data shown in FIG. 3 are produced. Furthermore, combination data which includes the shaded data and the asterisk are transferred to the display control circuit 505. As a result, the power saving mode which is selected by the knob 203 and the data which shows the remaining time are displayed on the liquid crystal display unit 504.

Figure 10:
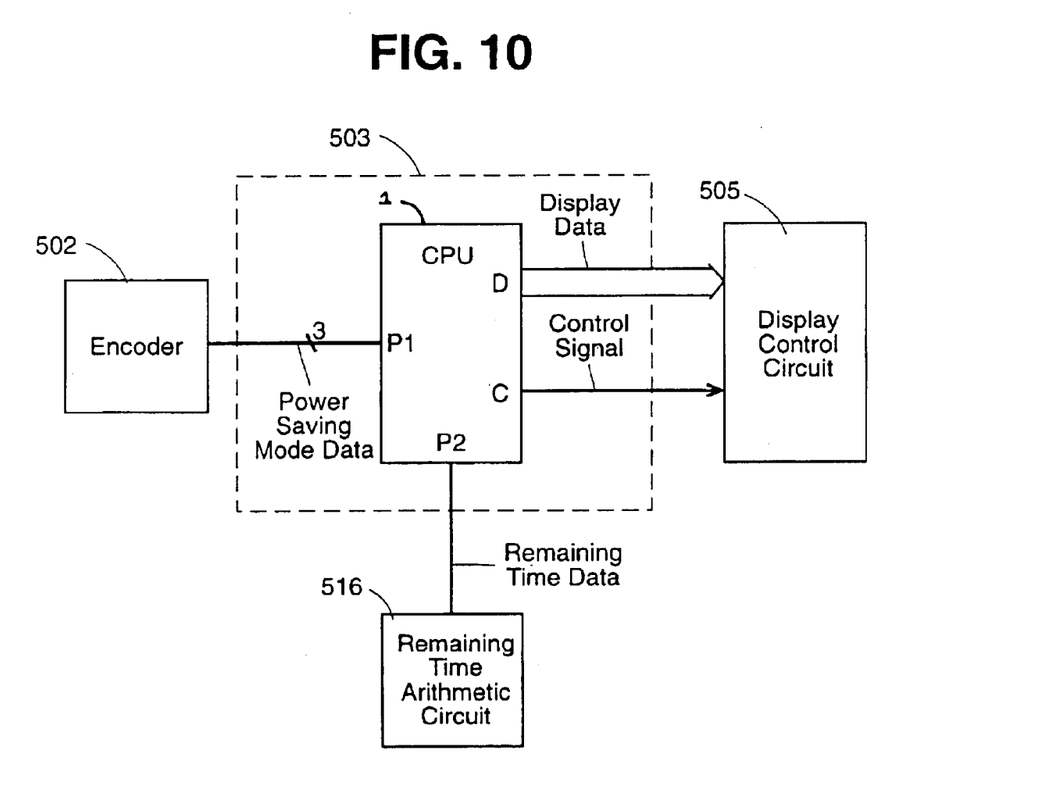
FIG. 10 is a block diagram showing a display data producing circuit.

FIG. 10 shows the display data producing circuit 503 of FIG. 5 in greater detail. Numeral 1 in FIG. 10 denotes a one chip CPU that includes input output ports P1 and P2, data output lines D0 through D7 from an output D of the one chip CPU 1, a control signal output line from output C of the one chip CPU 1, a ROM (not shown) that stores programs and a RAM (not shown) that stores data in calculations. The one chip CPU 1 produces display data using the programs stored in the ROM in accordance with the save power mode data inputted to port P1 from encoder 502 and remaining time data inputted to port P2 from the remaining time arithmetic circuit 516. The display data from the output D of the CPU 1 are transferred together with the control signal from the output C of the CPU 1 to display control circuit 505.

As described above, an operator can understand how long the battery can supply power if the personal computer 103 is operated in the current power saving mode and can decide an appropriate power saving mode for a desired operating time. The operator can also set an appropriate power saving mode which corresponds with the desired operation and the desired operating time by operating the rotary switch 501.

In the embodiment, the portable electric equipment is explained as a personal computer, but electrical equipment may be a word processor, an electric pocket notebook or portable calculator. Further in this embodiment, the power saving mode and the related estimated operating time are superimposed on the power saving condition display unit 107, but the power saving mode and the remaining battery capacity mode may be displayed in displays as described below.

Second Embodiment

Figure 6:
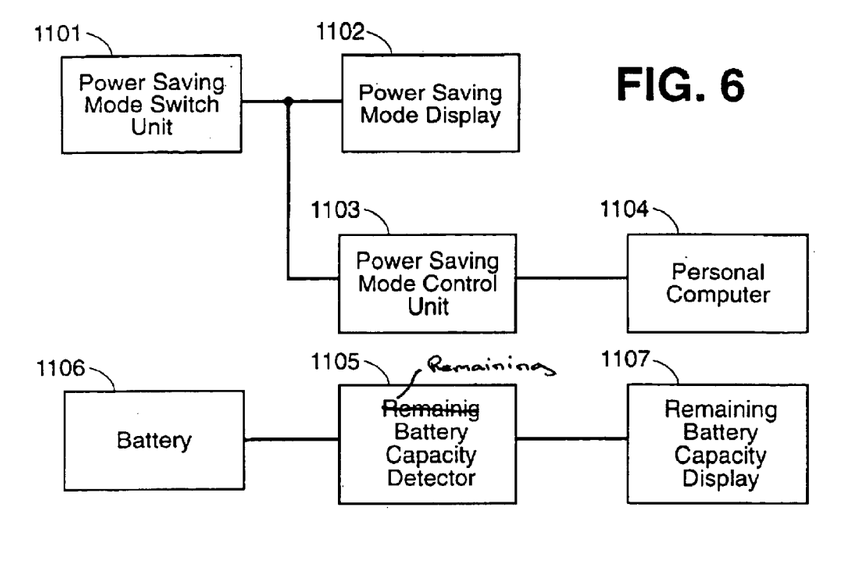
FIG. 6 is a block diagram showing construction of portable electric equipment in the second embodiment.

FIG. 6 is a block diagram showing the construction of electric equipment which is, for example, a personal computer in a second embodiment. In FIG. 6, a numeral 1101 is a power saving mode switching unit. A numeral 1102 denotes a power saving mode display unit for displaying a selected power saving mode by the power saving mode switching unit 1101. A numeral 1103 denotes a power saving mode control unit for controlling the power saving mode to execute the power saving mode selected by the power saving mode switching unit 1101 on a personal computer unit 1104. A numeral 1105 denotes a remaining battery capacity detecting unit for detecting the remaining capacity of 1106. A numeral 1107 denotes a remaining battery capacity display unit for displaying the remaining of battery capacity from the detecting unit 1105.

The operator can confirm the remaining battery by the remaining battery capacity display unit 1105 and can set an appropriate power saving mode for computing process and the time of the process.

As described above, in the second embodiment, the remaining capacity of the battery 1106 is detected by the detecting unit 1105 and displayed in the display unit 1107 and simultaneously, the power saving mode is displayed in the power saving mode display unit 1102.

Figure 7:
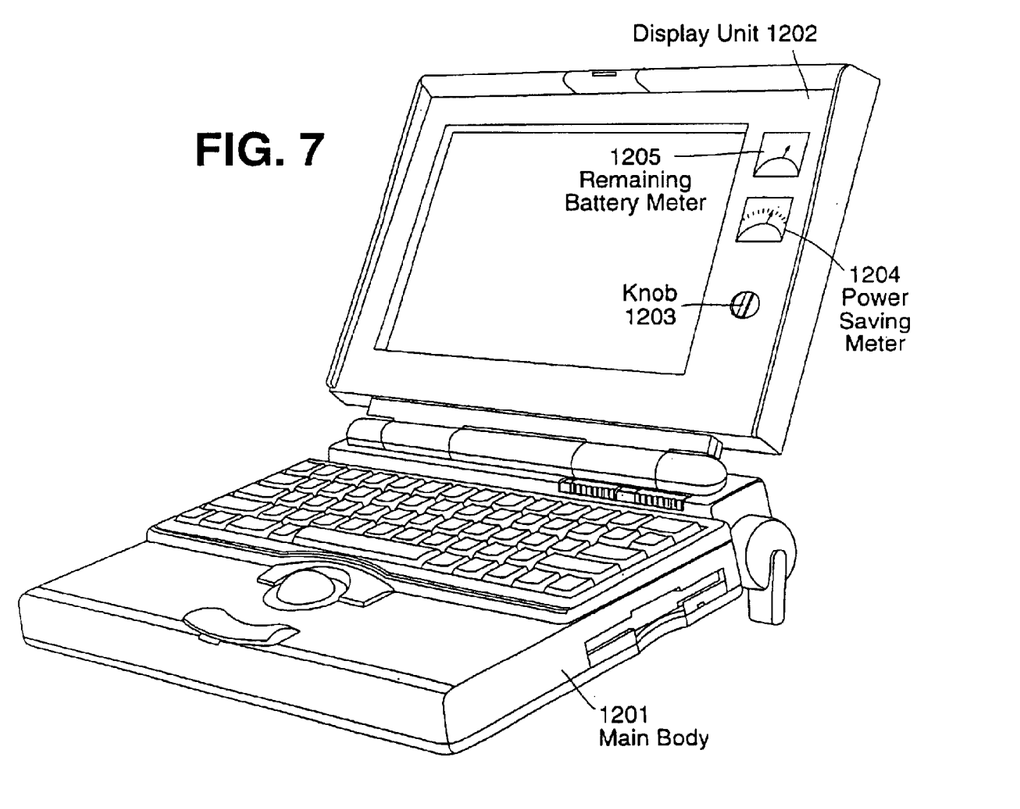
FIG. 7 is a perspective view of the portable electric equipment shown in FIG. 6.

As shown in FIG. 7, the power saving mode display unit 1102 shown as unit 1204 is provided next to the display unit 1107 shown as unit 1205. Therefore, the operator easily confirm the remaining battery and the power saving mode and can changing of the mode to a desired power saving mode. Then, the power saving mode control unit 1103 controls the processing speed of the personal computer unit 1104 and the brightness of the personal computer display unit.

FIG. 7 is a perspective of the electric equipment shown in FIG. 6. In FIG. 7, a numeral 1201 denotes a main body housing. 1202 denotes a display unit housing which includes a power saving mode changing knob 1203, a power saving mode meter 1204, and a remaining battery meter 1205. The knob 1203 corresponds to the power saving mode switch unit 1101 in FIG. 6. The power saving mode meter 1204 corresponds to the power saving mode display unit 1102 and the remaining battery meter 1205 corresponds to the remaining battery display unit 1107 in FIG. 6.

Figure 8:
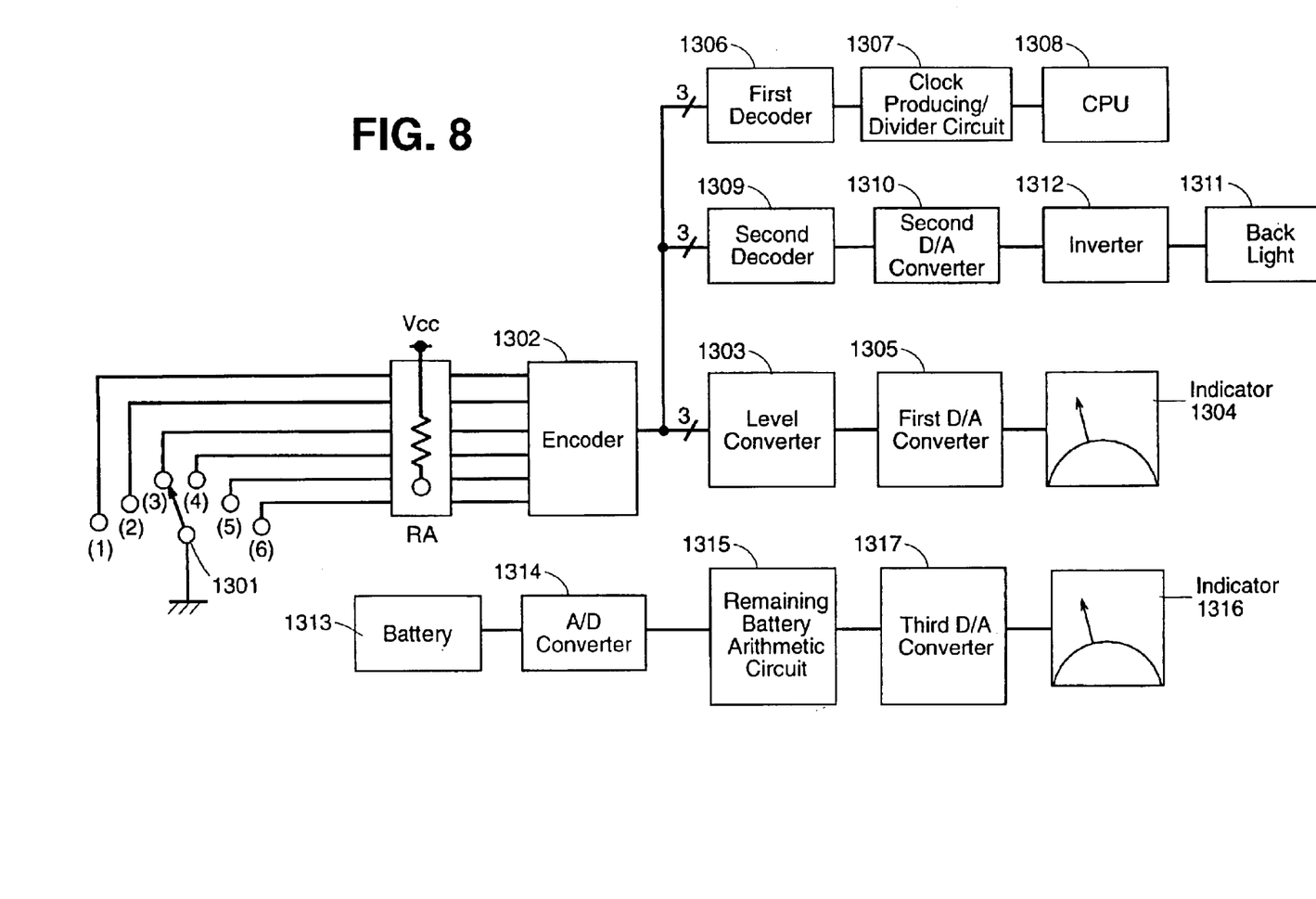
FIG. 8 is a block diagram showing construction of a control of the portable electric equipment shown in FIG. 7.

FIG. 8 is a block diagram showing control apparatus of the electric equipment in FIG. 7. A construction and operation of the control of FIG. 7 will be described below.

A rotary switch 1301 is linked with the knob 1203 shown in FIG. 7 and swivels to ground one of terminals 1 to 6. Each contact of contacts 1–6 is returned to Vcc through a resister RA and is connected to an encoder 1302. Therefore, only the contact selected by the rotary switch 1301 is at a low level and the other five contacts are at a high level. The encoder 1302 produces three bit data in accordance with the contact selected by the rotary switch 1301. Thus, if the contact 1 is selected, the encoder 1302 produced (0, 0, 1). If the contact 3 is selected, the encoder 1302 produces (0, 1, 1). If the contact 4 is selected, (1, 0, 0) is produced. If the contact 5 is selected, (1, 0, 1) is produced. If the contact 6 is selected, (1, 1, 0) is produced. In this embodiment, selecting one of the contacts 1 to 6 corresponds to selecting one of power saving mode 1–6.

The three data bits from the encoder 1302 are transferred to a level converting circuit 1303. The level converting circuit 1303 converts the three data bits to level data appropriate for indication on a meter 1304 (e.g. a voltmeter) for displaying a power saving mode. The level data which is converted by the level converter circuit 1303 is converted to an analog voltage for energizing the meter 1304 by a first D/A converter 1305. Therefore, the power saving mode of modes 1 to 6 selected by the knob 1203 is displayed by the meter 1304. The three data bits from the encoder 1302 are transferred to a first decoder circuit 1306. The first decoder circuit 1306 produces two bit data which shows a rate of divided clock frequency as described below.

That is, if the three bit data from the encoder 1302 is (0, 0, 1) or (0, 1, 0), the rate of divided clock frequency is x. If the three bit data from the encoder 1302 is (0, 1, 1) or (1, 0, 0), the rate of divided clock frequency is x/2. If the three bit data from the encoder 1302 is (1, 0, 1) or (1, 1, 0) the rate of frequency is x/4.

The two bit divided clock frequency signal from the first decoder 1306 is transferred to a producing/dividing clock circuit 1307. The producing/dividing clock circuit 1307 produces a 20 MHz clock and transfers the divided clock to a CPU unit 1308 in accordance with the dividing rate from the first decoder 1306. Namely, if the rate is x, the circuit 1307 produces a 20 MHz clock. If the rate is x/2, the circuit 1307 produces a 10 MHz clock, and if the rate is x/4, the circuit 1307 produces a 5 MHz clock.

Furthermore, the three bit data from the encoder 1302 is transferred to a second decoder 1309. The second decoder 1309 produces an electric current for driving an invertor 1312 as described below.

That is, if the three bit data from the encoder 1302 is (0, 0, 1), a digital value of the current for driving the inverter 1312 is (1, 1) and a back light quantity of the display is 3 W (3 watts). If the three bit data from the encoder 1302 is (0, 1, 0), (0, 1, 1), or (1, 0, 1), a digital value of the current for driving the inverter 1312 is (1, 0) and the back light quantity of the display is 2 W. If the three bit data from the encoder 1302 is (1, 0, 0) or (1, 1, 0), the digital value of the current for driving the inverter 1312 is (1, 0) and the back light quantity of the display is 1 W. The two bit current data from the second decoder 1309 is transferred to a second D/A converter 1310 and, after that, the converter 1310 produces current for driving an inverter 1312 which supplies voltage to the back light 1311 that may be, for example, a cold-cathode tube.

As described above, by operating the knob 1203, the operating frequency of the CPU unit 1308 in the personal computer unit 1104 of FIG. 6 changes between 20 MHz, 10 MHz and 5 MHz and light quantity of the back light 1312 changes between 3 W, 2 W and 1 W. Thus, the CPU operating frequency is 20 MHz and the back light is 3 W in the power saving mode 1. The CPU operating frequency is 20 MHz and the light quantity of the back light is 2 w in the power saving mode 2. The frequency is 10 MHz and the light quantity is 2 W in the mode 3. The frequency is 10 MHz and the light quantity is W in the mode 4. The frequency is 5 MHz and the light quantity is 2 W in the mode 5. The frequency is 5 MHz and the light quantity is 1 W in the mode 6.

For a higher operating frequency of the CPU 1308, the processing is faster and the electric consumption is higher. For a less working frequency of the CPU 1308, the processing is slower and the electric consumption is less. The more the light quantity, the greater is the electric consumption. The less the light quantity, the lower is the electric consumption. Therefore, power saving mode 1 has the fastest processing and consumes the most electricity. The power saving mode 6 has the slowest processing and consumes the least electricity.

In FIG. 8, a terminal voltage of a battery 1313 which drives the equipment is transferred to an A/D converter 1314. The A/D converter 1314 produces an eight bit digital value which is transferred to a remaining battery arithmetic circuit 1315. The circuit 1315 calculates the remaining battery in accordance with the digital value of the terminal voltage of the battery 1313. Furthermore, the circuit 1315 converts the calculated remaining battery into a digital value of a voltage which drives a meter 1316 for displaying the remaining battery. The digital value of the voltage is transferred to a third D/A converter 1317. The third D/A converter 1317 converts the voltage value into an analog voltage for driving the meter 1316 to display the remaining battery. Therefore, a needle of the meter 1316 indicates the remaining battery.

In FIG. 8, the rotary switch 1301 and the encoder 1302 correspond to the power saving mode switch unit 1101. The level converter 1303, the meter 1304 and the first D/A converter 1305 correspond to the power saving mode display unit 1102 in FIG. 6. The first decoder circuit 1306, the clock producing/dividing circuit 1307, the second decoder circuit 1309 and the second D/A converter 1310 correspond to the power saving mode control unit 1103 in FIG. 6. The CPU unit 1308 which includes the CPU and the peripheral circuit, the back light 1311 and the inverter 1312 correspond to the personal computer 1104 in FIG. 6. The battery 1313 corresponds to the battery 1106 in FIG. 6. The A/D converter 1314 and the remaining battery arithmetic circuit 1315 correspond to the remaining battery detecting unit 1105 in FIG. 6. The meter 1316 for displaying the remaining battery and the third D/A converter 1317 correspond to the remaining battery display unit 1107 in FIG. 6.

As described above, an operator can read the meter 1316 and can select the power saving mode 1 if the remaining battery capacity is large. The operator can then obtain a high processing speed and an easy-to-see display. On the other hand, if the remaining battery capacity is low, the operator can select mode 5 or mode 6 and can get obtain long operating time at the expense of processing speed and the ease of viewing.

In this embodiment, the meters 1204 and 1205 are voltmeters. But an LED display or a liquid crystal display may be used. If lower electric power is required, the liquid crystal display is used.

Figure 9:
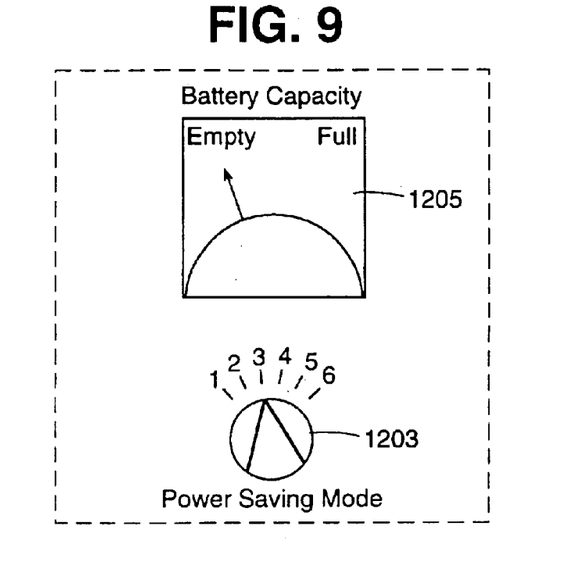
FIG. 9 shows an example of a button and a display meter for saving energy.

Furthermore, as shown in FIG. 9, if the tip of the knob 1203 indicates the numerals 1 to 6, the power saving mode switch unit serves as the power saving mode display unit. Therefore, the number of elements and the cost of the equipment can be reduced and space for the equipment can be used efficiently.

As described above, in the second embodiment, the remaining battery capacity of battery 1106 is detected by the remaining battery detecting unit 1105 and is displayed in the unit 1107 and, the knob 1203 which is provided in close relation to the unit 1107 can simultaneously indicate the current power saving mode. Therefore, an operator can easily confirm the remaining battery and the current power saving mode and can change the mode to the desired power saving mode. Then, the power saving control unit 1103 controls the processing speed of the personal computer unit 1104 and the brightness of the display unit.

In this embodiment, the portable electric equipment is explained in terms of a personal computer, but other electrical equipment, for example, a word processor or an electric calculator may be used.

As described above, the calculated remaining of time and the adopted power saving mode are exhibited together. Accordingly, the operator can easily understand how long the battery can supply the power if the equipment operates in the current power saving mode and can select the desirable and appropriate power saving mode to control the adequate CPU processing speed and the display unit brightness.

As described above, the detected remaining battery and the adopted power saving mode are displayed in close relationship. Therefore, the operator can easily determine how long the battery can supply power if the equipment operates in the current power saving mode and can select the desirable and appropriate power saving mode to provide adequate processing speed and adequate display brightness.

As described above, the detected remaining battery and the adopted power saving mode are indicated by the indicators. Therefore, the operator can easily understand how long the battery can supply power and can select the desirable and appropriate power saving mode to provide adequate processing speed of CPU and adequate brightness of the display unit.

As described above the present invention can provide electric equipment capable of superimposing remaining operating time and the adopted power saving mode. Accordingly, the operator can easily understand how long the battery can supply power if the equipment operates in the current power saving mode and the operator can select a desirable power saving mode to provide adequate processing speed of the CPU and adequate brightness of the display unit.

The present invention can provide electric equipment capable of displaying in close relationship the detected remaining battery capacity and the adopted power saving mode so that the operator can easily understand how long the battery can supply power if the equipment operates in the current power saving mode and can select the desirable and appropriate power saving mode to control processing speed of the CPU and brightness of the display unit.

The present invention can provide electric equipment capable of indicating the detected remaining battery capacity and the adopted power saving mode. Therefore, the operator can easily understand how long the battery can supply power and can select the desirable and appropriate power saving mode to control the processing speed of the CPU and the brightness of the display unit.

It is to be understood that the specific embodiments described herein are merely illustrative of the spirit and scope of the invention. Modifications can readily be made by those skilled in the art in accordance with the principles of the invention.

What is claimed is:

1. An electric equipment having a plurality of power saving modes, wherein each power saving mode is arranged for saving power consumption, comprising:

deriving means for deriving a remaining capacity of a battery, selecting means for selecting one of the plurality of power saving modes, calculating means for calculating a remaining operating time from data derived by said deriving means and the one of the plurality of power saving modes selected by said selecting means, and display means for displaying both the power saving mode selected by said selecting means and the remaining operating time calculated by said calculating means.

2. An electric equipment according to claim 1, further comprising control means for controlling a processing speed and a brightness of display in said equipment responsive to said selecting means.

3. An electric equipment according to claim 1, further comprising main display means for displaying data in relation to processed data in the electric equipment.

4. An electric equipment according to claim 1, wherein said display means continuously displays the power saving mode and the remaining battery capacity.

5. A method of operating electric equipment, comprising the steps of:

generating a signal representative of a remaining capacity of a battery supplying power to the electric equipment, selecting one of a plurality of power saving modes, wherein each power saving mode is arranged for saving power consumption, calculating a remaining operating time from data derived from the remaining battery capacity representative signal and the one of the plurality of power saving modes selected in said selecting step, and displaying both the power saving mode selected in said selecting step and the remaining operating time calculated in the calculating step.

6. An electric equipment having a plurality of power saving modes, wherein each power saving mode is arranged for saving power consumption, comprising:

deriving means for deriving a remaining capacity of a battery, selecting means for selecting one of the plurality of power saving modes, calculating means for calculating a remaining operating time from data derived by said deriving means and the one of the plurality of power saving modes selected by said selecting means, display means for displaying both the power saving mode selected by said selecting means and the remaining operating time calculated by said calculating means, and control means for controlling a brightness of display in response to the power saving mode selected by said selecting means.

7. A method of operating electric equipment, comprising the steps of:

generating a signal representative of a remaining capacity of a battery supplying power to the electric equipment, selecting one of a plurality of power saving modes, wherein each power saving mode is arranged for saving power consumption, calculating a remaining operating time from data derived from the remaining battery capacity representative signal and the one of the plurality of power saving modes selected in said selecting step, displaying both the power saving mode selected in said selecting step and the remaining operating time calculated in the calculating step, and controlling a brightness of display in response to the power saving mode selected by said selecting means.

* * * * *

UNITED STATES PATENT AND TRADEMARK OFFICE
CERTIFICATE OF CORRECTION

PATENT NO. : 6,947,035 B1 Page 1 of 1
APPLICATION NO. : 08/794772
DATED : September 20, 2005
INVENTOR(S) : Shinji Shiraga It is certified that error appears in the above-identified patent and that said Letters Patent is hereby corrected as shown below:

ON THE TITLE PAGE ITEM (30) FOREIGN APPLICATION PRIORITY DATA:
"5/218828" should read --5-218828--.

COLUMN 1:
Line 44, "desirable, power" should read --desirable power--.

COLUMN 4:
Line 15, "2 W 2" should read --2 W (2--.
Line 16, "watts) the" should read --watts). If the--.
Line 29, "mode 1 to 6" should read --modes 1 to 6--.
Line 57, "of" should be deleted.

COLUMN 5:
Line 51, "1106." should read --battery 1106.--
Line 67, "easily" should read --can easily--.

COLUMN 6:
Line 2, "changing" should read --direct changing--.
Line 34, "mode 1-6." should read --modes 1-6.--

COLUMN 7:
Line 22, "2 w" should read --2 W--.
Line 31, "less" should read --lower--.

COLUMN 8:
Line 59, "above" should read --above,--.

Signed and Sealed this

Thirtieth Day of October, 2007

JON W. DUDAS
*Director of the United States Patent and Trademark Office*